United States Patent
Lemke et al.

(10) Patent No.: US 9,938,868 B2
(45) Date of Patent: Apr. 10, 2018

(54) VENTILATION SYSTEM FOR SUPERCHARGED COMBUSTION ENGINES

(71) Applicant: REINZ-DICHTUNGS-GMBH, Neu-Ulm (DE)

(72) Inventors: Kai-Uwe Lemke, Ulm (DE); Robert Baerreiter, Ulm (DE)

(73) Assignee: Reinz-Dichtungs-GmbH, Neu-Ulm (DE)

( * ) Notice: Subject to any disclaimer, the term of this patent is extended or adjusted under 35 U.S.C. 154(b) by 0 days.

(21) Appl. No.: 14/392,381

(22) PCT Filed: Sep. 25, 2014

(86) PCT No.: PCT/EP2014/070460
§ 371 (c)(1),
(2) Date: Mar. 8, 2016

(87) PCT Pub. No.: WO2015/044252
PCT Pub. Date: Apr. 2, 2015

(65) Prior Publication Data
US 2016/0290193 A1    Oct. 6, 2016

(30) Foreign Application Priority Data

Sep. 26, 2013 (DE) .................... 20 2013 008 611 U (51) Int. Cl.
*F01M 13/02* (2006.01)
*F02M 25/06* (2016.01)
(Continued)

(52) U.S. Cl.
CPC ...... *F01M 13/023* (2013.01); *F01M 13/0011* (2013.01); *F01M 13/022* (2013.01);
(Continued)

(58) Field of Classification Search
CPC ....... F01M 2013/027; F01M 2013/494; F01M 13/00; F02M 13/02
(Continued)

(56) References Cited

U.S. PATENT DOCUMENTS 4,922,882 A * 5/1990 Topfer ................. F02M 15/022
123/556
6,457,462 B2    10/2002 Moren
(Continued)

FOREIGN PATENT DOCUMENTS

DE           8433272 U1    5/1985
DE      202004004801 U1    5/2004
(Continued)

OTHER PUBLICATIONS

German Patent and Trademark Office; German Search Report, Jun. 18, 2014, 3 pages, German Patent and Trademark Office, Munich, Germany; with cover page of published German priority document DE202013008611U1 and detailed citation list.
(Continued)

*Primary Examiner* — Jacob Amick
*Assistant Examiner* — Charles Brauch
(74) *Attorney, Agent, or Firm* — Marshall & Melhorn, LLC (57) ABSTRACT

A ventilation system for a crankcase for the transport of blow-by gases from the crankcase to the intake section of an internal combustion engine with supercharger. A ventilation line reaches from the crankcase to the segment of the intake section between the supercharger and the air inlet valve. An air-oil separator is arranged in the ventilation line, as well as a return line for the return of oil separated in the air-oil separator via a tank and a tank outlet valve into the crankcase. An actuating element is arranged in or at the tank. The actuating element is charged with the pressure in the intake
(Continued)

line behind the supercharger as working pressure and which upon sufficiently high pressure transports the oil present in the tank via the tank outlet valve into the crankcase.

11 Claims, 7 Drawing Sheets

(51) Int. Cl.
    *F01M 13/04*     (2006.01)
    *F01M 13/00*     (2006.01)

(52) U.S. Cl.
    CPC ............ *F01M 13/04* (2013.01); *F02M 25/06* (2013.01); *F01M 13/00* (2013.01); *F01M 13/02* (2013.01); *F01M 2013/0044* (2013.01); *F01M 2013/027* (2013.01); *F01M 2013/0494* (2013.01); *Y02T 10/121* (2013.01)

(58) Field of Classification Search
    USPC .......................................................... 123/573
    See application file for complete search history.

(56) References Cited

U.S. PATENT DOCUMENTS

| | | | |
|---|---|---|---|
| 7,007,682 B2 | 3/2006 | Takahashi et al. | |
| 8,439,022 B2 | 5/2013 | Ruppel et al. | |
| 2002/0046743 A1* | 4/2002 | Moren | F01M 13/022 |
| | | | 123/572 |
| 2003/0106543 A1* | 6/2003 | Gschwindt | F01M 13/022 |
| | | | 123/572 |
| 2006/0254566 A1* | 11/2006 | Yasuhara | F01M 13/022 |
| | | | 123/572 |
| 2007/0144155 A1* | 6/2007 | Moncelle | B60T 17/002 |
| | | | 60/289 |
| 2010/0037867 A1* | 2/2010 | Kleckler | F02C 7/236 |
| | | | 123/510 |
| 2010/0229510 A1* | 9/2010 | Heinen | B01D 45/08 |
| | | | 55/322 |

FOREIGN PATENT DOCUMENTS

| | | |
|---|---|---|
| DE | 202004004802 U1 | 6/2004 |
| DE | 202005018132 U1 | 3/2007 |
| DE | 102006019634 A1 | 10/2007 |
| DE | 202006017813 U1 | 3/2008 |
| DE | 102006054117 A1 | 5/2008 |
| DE | 102007012481 A1 | 9/2008 |
| DE | 102007012483 A1 | 9/2008 |
| DE | 102012001458 A1 | 7/2013 |
| JP | 2003-013723 A | 1/2003 |

OTHER PUBLICATIONS

European Patent Office; International Search Report and Written Opinion of PCT/EP2014/070460, dated Jan. 7, 2015, 7 pages, European Patent Office, Rijswijk, Netherlands.

Japanese Patent Office, First Office Action issued in corresponding Japanese application No. 2016-543438 dated Jan. 10, 2017; Tokyo, Japan.

\* cited by examiner

Figure 1:
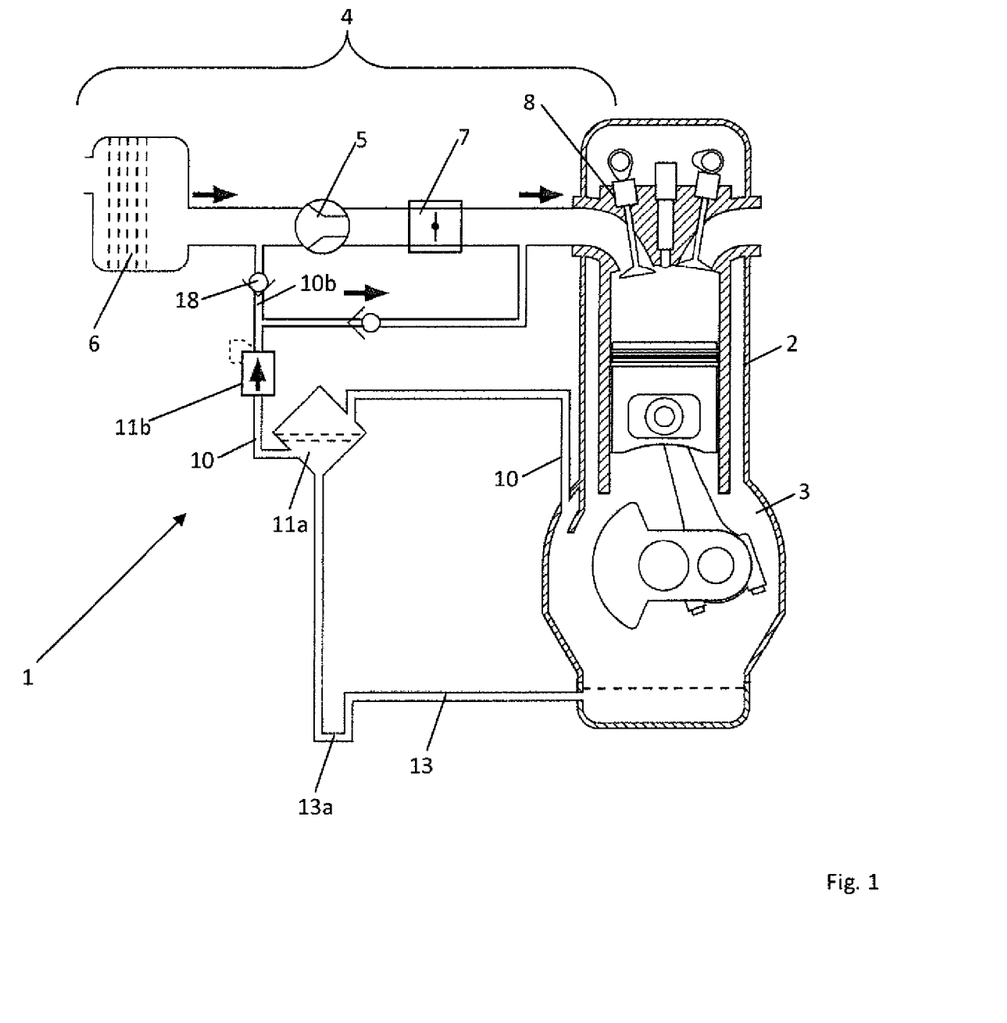
FIG. 1: A scheme of a combustion engine according to the state of the art.

Fig.10 though the section 100c of the ventilation line and flows towards an air-oil separator 11a, from which the purified gas flows further through section 100d to a pressure control valve 11b, which is followed by section 100e of the ventilation line. Thus, an air-oil separator 11a and a pressure-control valve 11b are arranged in this sequence in the ventilation line. Behind the pressure control valve 11b, the ventilation line 100 in its section 100e branches off, so that the section 100e in total shows a T-shape. One of its branches together with section 100a of the ventilation line constitutes the ventilation line for partial-load operation, while the other one of its branches together with section 100b of the ventilation line forms a ventilation line for full-load operation. Both in the ventilation line for partial-load operation and the ventilation line for full-load operation, return valves 12 (in the ventilation line for partial load) and 18 (in the ventilation line for full load), respectively, form the transition between section 100e and sections 100a and 100b, respectively.
VENTILATION SYSTEM FOR SUPERCHARGED COMBUSTION ENGINES

BACKGROUND OF THE INVENTION

The present invention relates to a ventilation system for a crankcase of an internal combustion engine.

In the crankcase of an internal combustion engine, blow-by gases arise which for reasons of environmental protection are usually led to the intake section of the combustion engine. The pressure difference between the crankcase and the intake section is used in order to return the blow-by gases from the crankcase into the intake section.

A ventilation system for a crankcase for the transport of blow-by gases thus usually comprises a ventilation line which reaches from the crankcase to the intake section. Further, an air-oil-separator is arranged in the ventilation line in order to separate oil and oil mist contained in the blow-by gases from these blow-by gases. The air-oil separator and/or the return line may comprise a tank for separated oil. The separated oil is then returned from this air-oil separator to the crankcase. It shall be stressed that in the context of this invention, ventilation does not mean the provision of fresh air to the crankcase but the transport of blow-by gases from the crankcase to the intake section.

What is problematic with this is that the return of the separated oil into the crankcase has to be effected against a pressure difference between the air-oil separator and the crankcase. To this end, different solutions have been developed in the state of the art. On the one hand, it is possible to integrate a siphon into the oil return line reaching from the air-oil separator to the crankcase which when sufficiently highly filled with separated oil is able to overcome the pressure difference relative to the crankcase. It is however disadvantageous that with the space available, a siphon of only very limited height can be installed so that only small pressure differences can be surmounted. This means that the return of the oil from the air-oil separator to the crankcase through the siphon can only be realized if favorable pressure conditions are given, meaning a small pressure difference between the air-oil separator and the crankcase. Thus only with particular operating conditions of the combustion engine, a sufficient return of the oil from the air-oil separator to the crankcase is ascertained. With this solution, it is required to arrange the air-oil separator ahead of the pressure control, as otherwise under partial-load operation, the pressure conditions required for the oil return do never occur. This in turn is related to the disadvantage that the pressure control only takes place in relation to the crankcase pressure plus the pressure difference at the air-oil separator. Variable blow-by volumes cause very different pressure differences at the air-oil-separator. As the design of the air-oil separator and of the pressure control system has to be realized with respect to the worst case, under average operation conditions, only a smaller pressure difference than the one actually available can be used for the air-oil separation so that an unnecessary high percentage of oil remains in the blow-by gas. While an inverted arrangement of air-oil separator and pressure-control valve would increase the pressure difference available for the air-oil separation for most of the situations, it would at the same time increase the pressure difference between the separated oil and the crankcase pressure, so that the return of the separated oil was even deteriorated.

A further alternative consists in collecting the separated oil in a tank. This tank, preferably at its bottom wall, is connected with the crankcase via a draining line or return line, with a return valve being installed in the draining line or return line as tank-outlet valve. With this solution, the separated oil is collected in the tank as long as the effective pressure resulting from the pressure difference between the crankcase and the intake section and the preload of the valve is higher than the oil pressure in the tank, thus the pressure resulting from the collected oil. The collected oil is then returned into the crankcase, for instance when the engine is shut down. In order to achieve good draining performance and a complete emptying, the tank closure valve shows no or only a small preload, which on the other hand means that due to insufficient sealing, untreated blow-by gas may reach the intake section. In order to allow for long periods of operation, it is further required to provide for a sufficient tank volume, which has a negative impact on the demand in installation space.

FIG. 1 shows an internal combustion engine in a schematic cross-section. The combustion engine 2 with crankcase 3 comprises a intake section 4 in which an air filter 6, a supercharging device 5, a throttle flap 7 and an air inlet valve 8 are arranged one after the other in the flow direction of the entering air. In the state of the art, turbo chargers and compressors are known as supercharging devices.

Between the crankcase 3 and the intake section 4, a ventilation line 100 is arranged, which comprises the sections 100a to 100e. The blow-by gas leaves the crankcase 3

During partial-load operation of the combustion engine 2, downstream the return valve 12, thus in section 100a of the ventilation line, a vacuum compared to the pressure in the crankcase 3 is given. Therefore, the return valve 12 in the ventilation line for partial load is open and the blow-by gases are sucked via the sections 100c, 100d, one branch of 100e, 100a of the ventilation line 100 via the intake section 4 into the engine 2.

During full-load operation, the compression device 5 causes a compression of the combustion air so that now downstream of the compression device 5 including section 100a of the ventilation line, a higher pressure compared to the pressure in the crankcase 3 is given. This causes a closure of the return valve 12 in the ventilation line 100a for partial load. The crankcase gases are now ventilated via the sections 100c, 100d, one branch of 100e, and 100b of the ventilation line into the intake section 4 in its segment upstream of the compressor 5, thus for instance between the air filter 6 and the compressor 5.

This way, a ventilation of the crankcase is guaranteed both during partial-load operation as well as during full-load operation. Starting at the air-oil separator 11a, an oil-return line with a siphon 13*a* is arranged between the air-oil separator 11*a* and the crankcase 3, via which separated oil is returned into the crankcase 3. As described beforehand, it is required to design this oil-return line 13 and especially the siphon 13*a* in such a way that at least under favorable pressure conditions, the separated oil is returned into the crankcase surmounting the higher pressure given in the crankcase. At the same time, the oil forms a barrier for blow-by gases.

SUMMARY OF THE INVENTION

It is therefore the object of the present invention to provide for a ventilation system to be used in an internal combustion engine with supercharging device, with which the return of oil separated from the blow-by gases into the crankcase is possible even against high pressure differences between crankcase and intake section. The return of separated oil shall also be enabled against a sufficiently pre-loaded and therefore fluid-tight tank-outlet valve between tank and crankcase. Further, the draining performance shall be increased compared to the state of the art so that a faster oil return is enabled. It is also an object of the present invention to provide for a combustion engine with an improved ventilation system.

This object is solved by the ventilation system according to claim 1 and the combustion engine according to claim 9. Advantageous embodiments of the ventilation system according to the invention are given in the respective dependent claims.

For the present invention of a crankcase ventilation system transporting blow-by gases from the crankcase to the intake section of an internal combustion engine with supercharging, it is essential that the solution for the intermediate storage of the separated oil in a tank described above is improved in such a way that this oil can now also be returned into the crankcase even with higher pressure differences between the crankcase and the intake section. To this end, according to the invention, an actuating element is arranged in or at the tank, which is charged with the pressure which is given in the ventilation line in the segment of the ventilation line behind the first return valve as the working pressure. With this, the actuating element is charged with such a pressure as working pressure, which in the flow direction is given behind the first return valve in the ventilation line. This is also the pressure given in the intake line of the intake system between the supercharging unit and the engine. If this working pressure is sufficiently high, namely higher than the pressure difference resulting from the pre-load of the tank-outlet valve and internal friction of the system, the actuating element transmits this pressure to open a tank-outlet valve against the pressure in the crankcase and to transport the oil in the tank via the tank-outlet valve into the crankcase.

In case no first return valve is given, the pressure given in the intake line of the intake system between the supercharging unit and the engine defines the working pressure.

It is thus the essential concept of the present invention to use the supercharging pressure in an internal combustion engine for an active oil return for separated oil into the crankcase. One of the essential problems in the state of the art is the insufficient tightness of the tank-outlet-valve in the return line for separated oil, which is arranged between the tank and the crankcase. Given that the supercharging pressure is considerably higher than the crankcase pressure, it is possible to open this tank-outlet valve although it is designed with a considerable pre-load, which ascertains its tightness. This way, the separated oil can be returned to the crankcase and the sealing problems known in the state of the art for this kind of valves can be eliminated. The design according to the invention does not require any siphon. This reduces the space required for the return device. Nevertheless, it is possible to integrating an additional siphon in an additional return line.

Each time when the pressure difference between the intake line behind the throttle flap and the crankcase changes from positive to negative, the actuating element is returned into its original position, thus the position prior to the return of the oil. This shows that no additional or active element, such as a spring, is required in order to return to the original situation. The regular alternation between full-load and partial-load operation and vice versa thus provides for the oil return to the crankcase and for the return of the oil return device into its original state.

It goes without saying that the invention also relates to internal combustion engines with supercharger where the ventilation line behind the air-oil separator is split into a ventilation line for partial load and a ventilation line for full load, where the ventilation line for partial load comprises the first return valve mentioned.

It shall be stressed that all internal combustion engines with supercharger and split of the ventilation line for full-load operation and partial-load operation already comprise at least one return valve in the ventilation line between the air-oil separator and the intake system. The present invention makes additional use of this first return valve in order to charge the actuating element with a pressure as the working pressure, which is higher than the pressure of the blow-by gases given ahead of the first return valve in flow direction.

It is a further advantage of the ventilation system according to the invention that a pressure control valve in the ventilation line does not need to be located behind the air-oil separator as is the case in the state of the art. In contrast, the ventilation system according to the invention makes it possible that relative to the flow direction, a pressure control valve may be installed ahead of the air-oil separator allowing for a higher oil separation rate, as the forced return of the oil is essentially independent of the pressure drop at the air-oil separator. The valve does not have to be optimized for the oil return.

To summarize, the solution according to the invention requires little space, only, provides for a high draining rate and using the charge-air pressure makes it possible in engines with supercharger to return separated oil to the crankcase even against the pressure in the crankcase.

In this entire description, if nothing else is mentioned, all statements with respect to direction relate to the flow direction of the fluids. All pressure differences, if nothing else is mentioned, relate to the pressure in the crankcase.

Advantageously, the actuating element is charged with the working pressure via a) a passage between the actuating element and the ventilation line behind the first return valve in the ventilation line or b) via a line from the intake system between the supercharger and the air intake valves. As actuating elements, one can generally use flexible and/or moveable elements, which transfer the working pressure, thus for instance the pressure in the ventilation line behind the first return valve, to the separated oil. As actuating elements, pressure pistons, elastic membranes, rolling membranes or bellows, respectively, arranged in or at the tank are suited. All these elements move or deform under pressure in the direction of the separated oil, this way reduce the space of the tank and increase the pressure in the tank. With a sufficiently high charge-air pressure of the internal combustion engine, the pressure in the tank then exceeds the closure pressure of the tank-outlet valve in the return line between the tank and the crankcase so that the separated oil is returned into the crankcase, against the pressure in the crankcase. It is in general possible that the actuating element also stretches during operation. It is however preferred that the actuating elements only move or deform If the actuating element is realized as an elastic or rolling membrane, it is preferably made from a fluorosilicone, fluoro rubber, nitrile-butadiene-rubber or hydrogenated nitrile-butadiene-rubber.

The present invention thus enables an active oil return from the area immediately behind the air-oil separation to the crankcase and to this end uses the charge-air pressure of a supercharger in an internal combustion engine with supercharger.

The present invention is particularly advantageous in internal combustion engines with supercharger, where the air-oil separator is designed in such a way that it already incorporates a pressure-control unit, such as is the case in the valves or air-oil separators including such valves disclosed in DE 10 2007 012 481 A1. It thus comprises a valve for the control of a gas stream with a valve housing enclosing an inner chamber of the valve, at least one pressure-sided inlet and a suction-sided outlet. The suction-sided outlet comprises at least one passage opening in the wall of the housing, which connects the inner chamber of the valve with the outside of the valve. An elastically moveable membrane is arranged at the housing of the valve, which dependent on the pressure given in the inner chamber of the valve and a reference pressure—often the atmospheric pressure—opens and closes the at least one passage opening. The housing at least in sections is formed as a frustrum of a cone. It is preferred that the elastically moveable membrane is formed as a frustrum of a cone, too, with the shape being adapted to the shape of the housing. The base of the frustrum of a cone at least in sections is closed by the elastic membrane. The elastic, moveable membrane is arranged in such a way that in case the pressure in the inner chamber of the valve falls below the reference chamber, it unrolls on the inner surface of the housing while covering at least one of the at least one passage openings. If the pressure in the inner chamber increases again, the membrane unrolls in the opposite direction and opens at least one of the passage openings.

This valve can also be considered as an air-oil separator with pressure control function, as the blow-by gases during their passage through the at least one passage opening are accelerated given the reduction of flow cross section.

The elastic membrane used in this combined valve/air-oil separator is preferably chosen as a rolling membrane, comparable to some embodiments of the actuating element. It preferably unrolls on the inner surface of the valve housing. The materials for the membrane may be the same as for the membrane of the actuating element.

The housing is preferably designed in such a way that it has the shape of a frustrum of a cone with the cone showing an opening angle between the wall legs of between 0 and 180°, preferably 70 to 110° and most preferably about 90°. This means an angle between the generatrix and the axis of the cone of between 0 and 90°, preferably 35 to 55° and most preferably about 45°. While it is possible to design the housing as one-piece, it preferably design it as multi-piece. Such a multi-piece housing comprises two shells, where the inner shell is arranged in the outer shell, one of the two shells has to be realized as one-piece in order to provide tightness. The at least one passage opening is formed such that it passes through both shells, preferably in a flush manner.

The air-oil separator requires that at least one passage opening is given in the wall of the housing of the valve. However, it is preferred that this wall comprises a plurality of passage openings. Advantageously, at least some of the passage openings have different distance to the base of the frustrom of a cone. While the provision of passage openings as such already results in an air-oil separation effect for blow-by gases passing through the at least one passage opening in the wall of the housing, it is preferred that helix-shaped elements are arranged at least in one of the passage openings, advantageously in several passage openings. The at least one passage opening thus forms a flow-through tube with a gas inlet, a gas outlet, and a helix-shaped segment disposed between the gas inlet and the gas outlet. The helix-shaped segment preferably shows thread surfaces defining a helix-shaped gas flow path with an inner wall of the flow-through tube, wherein the helix-shaped segment has a length not greater than 0.5 times a pitch of the helix-shaped segment. Most preferably, the at least one helix-shaped element is integrally formed with the wall of the housing of the valve, thus as one piece. If the wall of the housing of the valve comprises two shells, it is preferable if such a helix-shaped element is integrally formed in at least one of these shells, it may however also be formed in both of these shells. If helix-shaped elements are integrally formed in at least two consecutive shells, it is preferred if they have opposite rotational direction of their respective helix.

With this particular air-oil separator, especially if separate ventilation lines are given for full-load and partial-load operation, an optimal air-oil separation rate can be achieved as it provides optimized pressure conditions for air-oil separation and at the same time, the oil return according to the invention with the actuating element provides for an optimal oil return.

It is advantageous if the tank in addition comprises a tank-inlet valve which at least during the opening of the tank-outlet valve is closed. The closure of this tank-inlet valve can also be effected by the actuating element. To this end, the actuating element as a consequence of the pressure applied can cover the valve opening of the tank-inlet valve, can close it as a valve disk or can move an actual valve disk. If for instance a pressure piston is used as the actuating element, it can move over the opening of the tank-inlet valve when the charge-air pressure is applied and this way close the tank-inlet valve. A covering of the opening of the tank-inlet valve by a flexible membrane, which realizes this movement under the influence of the charge-air pressure, is possible, too.

Advantageously, an oil-foam barrier can additionally be arranged between the air-oil separator and the tank, which is passed once, twice or several times by the blow-by gases in the ventilation system.

BRIEF DESCRIPTION OF THE DRAWINGS

In the following, some examples of ventilation systems according to the invention are given. In these examples, identical or similar elements are denoted with identical or similar reference numbers, so that their explanation in part is not repeated. With the following examples, a plurality of advantageous characteristics of the present invention is given in different combinations. These individual characteristics can however also improve the invention separately, thus without combination with the remaining characteristics of the respective example.

It is shown in

DETAILED DESCRIPTION OF THE INVENTION

FIG. 1 shows an internal combustion engine according to the state of the art as already described above.

Figure 2:
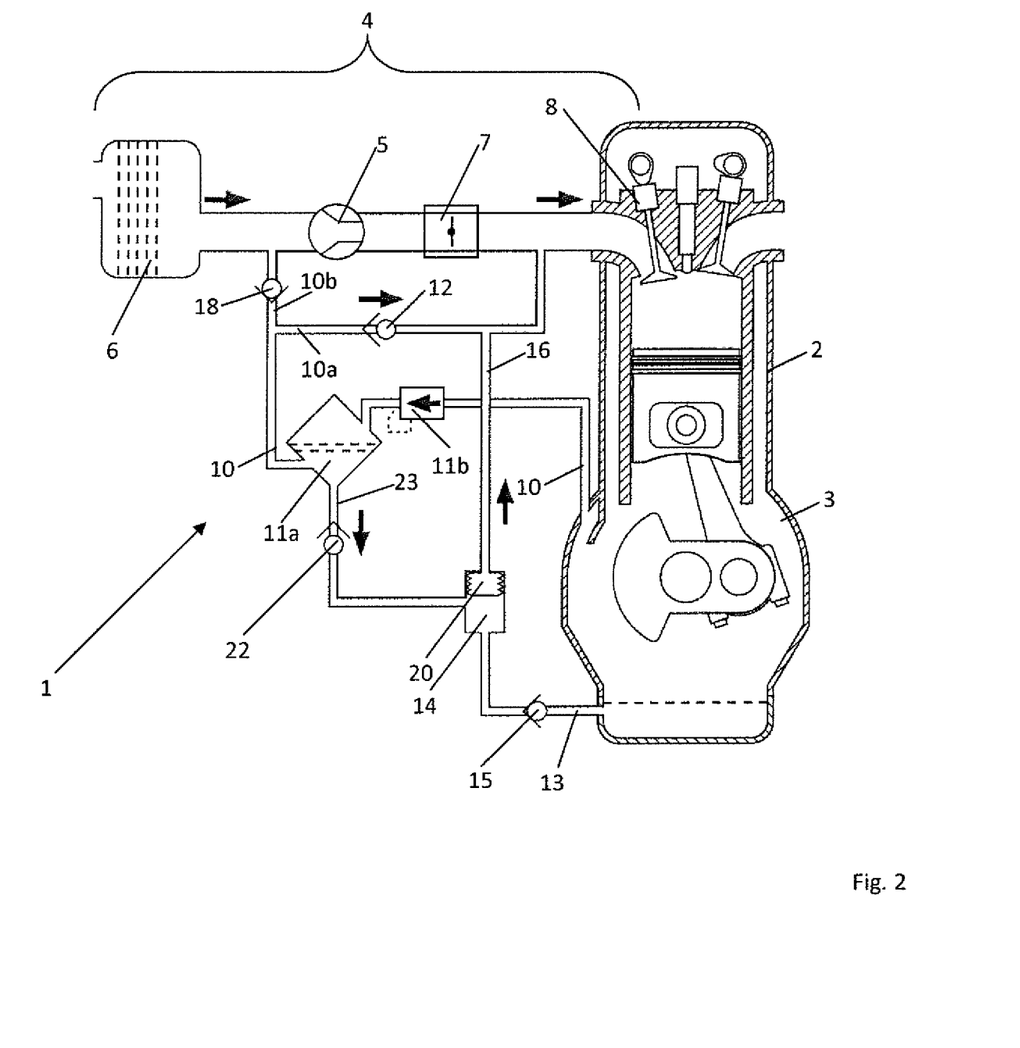
FIG. 2: A scheme of a combustion engine with a ventilation system according to the invention under partial load conditions.

FIG. 2 shows a further internal combustion engine 2, which has been adapted according to the invention. To this end, a bellows is arranged as the actuating element 20 in the tank 14. The line 23 leading to the tank 14 further comprises a return valve 22 as the tank-inlet valve, which under an excessive pressure in the tank 14 compared to the pressure in section 10e of the ventilation line 10 closes. The ventilation line 10 here comprises the sections 10a to 10e. Further, in the return line 13 reaching from the tank 14 to the crankcase 3, via which separated oil is returned to the crankcase 3, a return valve 15 as the tank-outlet valve is provided which under a higher pressure of the crankcase relative to the pressure in the tank 14 closes.

A connection line 16 branches off from this ventilation line 10, which in the present case operates as ventilation line 10a for partial-load operation, namely at a position in gas flow direction behind the first return valve 12 in the partial-load ventilation line 10a. This connection line 16 connects the intake section 4, or to be more precise, its segment between the supercharger 5 and the air inlet valve 8, with the inner space of the bellows 20. During partial-load operation, as it is depicted in FIG. 2, a vacuum relative to the crankcase is given behind the throttle flap 7 in the intake section 4. Therefore, the first return valve 12 is open. In the inner space of the bellows 20 used as actuating element, the connection line 16 also causes a vacuum. As a consequence, the bellows in turn does not exert any pressure to the inner space of the tank 14 and the separated oil in the tank 14. The tank-outlet valve 15 is therefore closed and in the situation shown, the tank-inlet valve 22 is open. This way, oil separated in the air-oil separator 11a can be collected in the tank 14.

Figure 3:
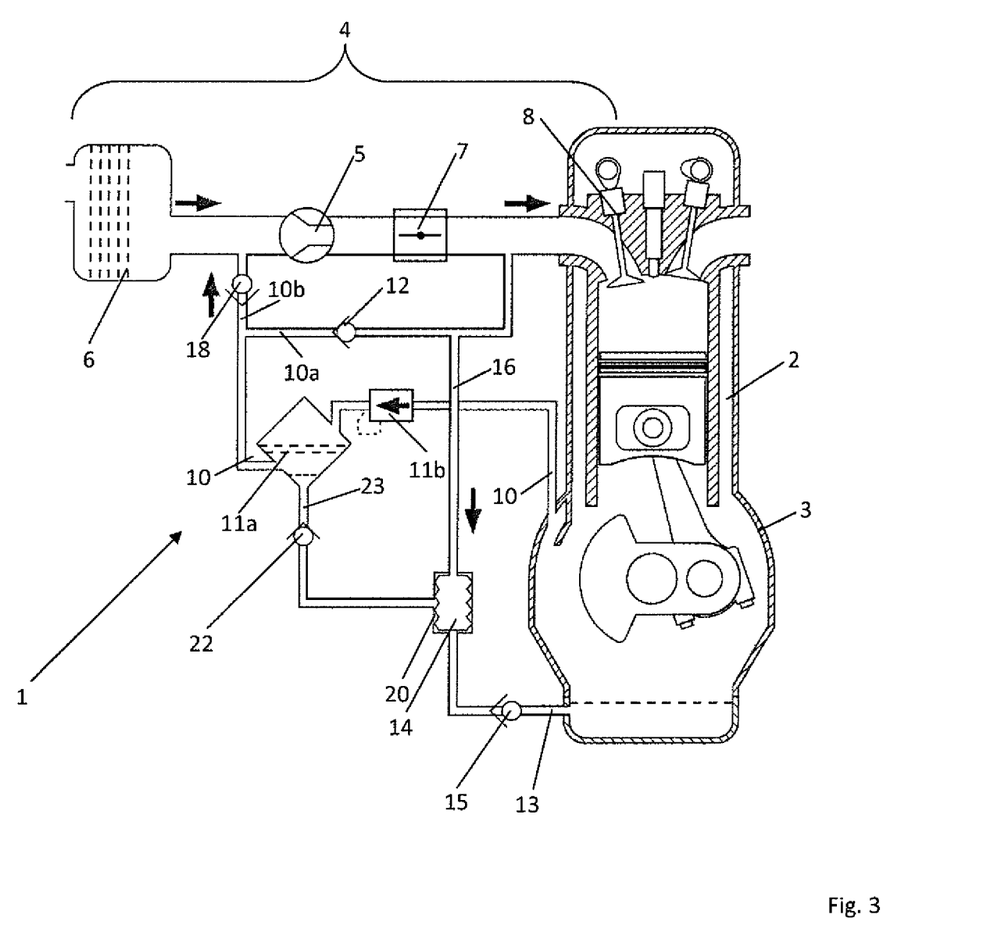
FIG. 3: The same combustion engine as in FIG. 2 under full-load conditions.

FIG. 3 now shows the same internal combustion engine 2 operating under full load. Here, the supercharger 5, e.g. a turbocharger or a compressor, produces a high pressure downstream, thus in the flow direction of the intake air in the intake section 4. The first return valve 12 in the ventilation line 10a for partial load is now closed. For this case, a second branch of the ventilation line can be provided, namely a ventilation line 10b for full-load operation, in which a second return valve 18 operating opposite to the first return valve 12 is given. Under full load, the inner space of the bellows 20 is now exposed to the charge-air pressure of the supercharger 5 via the connection line 16 so that the bellows expands and transmits the charge-air pressure to the inner space of the tank 14. This high pressure now closes the tank-inlet valve 22 and opens the tank-outlet valve 15 in the return line 13. The separated oil in the tank 14 is now pressed into the crankcase by this pressure, which corresponds to the charge-air pressure or is derived from the latter. The intake section 4 and the crankcase 3 nevertheless remain separated by the actuating element 20.

Thus, the present invention makes it possible that the tank 14 can be emptied each time when the compressor 5 causes a change in load from partial-load operation to full-load operation, thus each time when the pressure difference between the line 16 and the crankcase 3 changes from negative to positive.

Each time when the pressure difference between the line 16 and the crankcase 3 changes from positive to negative, the actuating element 20 is returned into its original position. Thus, if a bellows is used as the actuation element 20, it is retracted and the deformation is inverted. This shows that no additional or active element, such as a spring, is required in order to return to the original situation.

As the charge-air pressure used for this is sufficiently large, the tank-outlet valve 15 can be sufficiently preloaded and therefore sufficiently sealed.

It is thus advantageous with the present solution that a high draining rate can be achieved with a low demand in space. In particular, the demand in space is not increased compared to the solutions in the state of the art. In addition, it is possible to also place the air-oil separation 11a behind a pressure control valve 11b in the ventilation line as the emptying of the tank 14 is mainly independent of the pressure loss in the air-oil separator.

The present invention thus enables an active oil return using the charge-air pressure of a supercharger in an internal combustion engine with supercharger.

Figure 4:
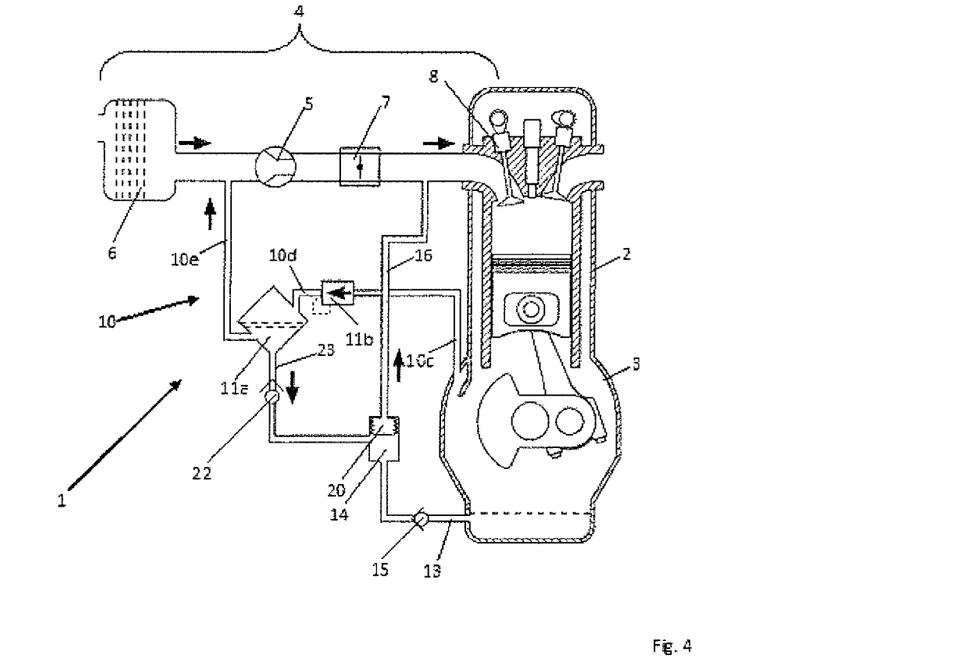
FIG. 4: A scheme of another combustion engine with a ventilation system according to the invention under partial load conditions.
Figure 5:
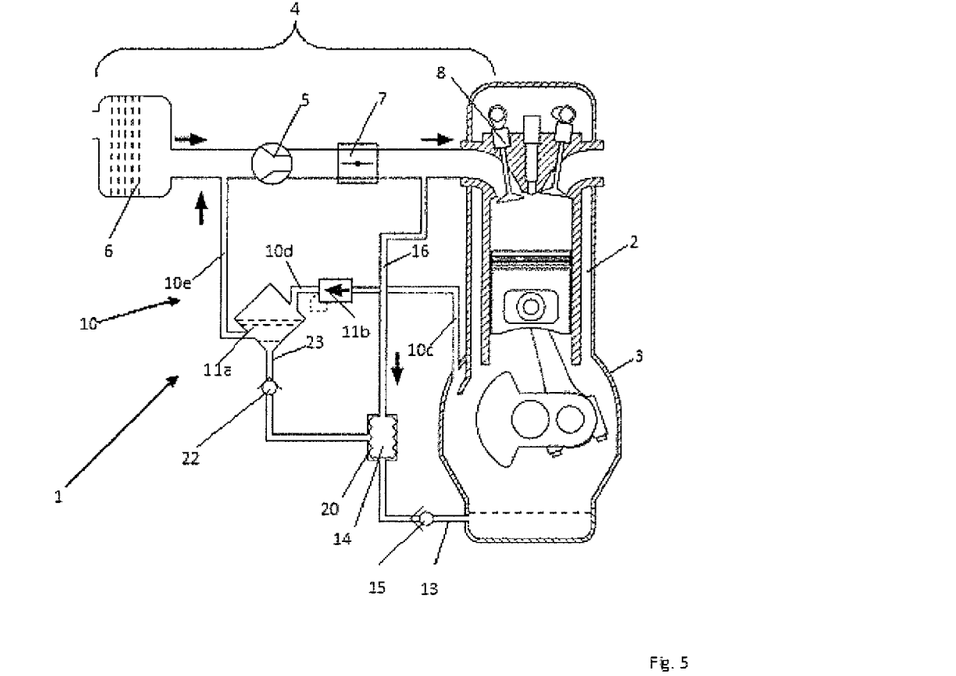
FIG. 5: The same combustion engine as in FIG. 4 under full-load conditions.

FIGS. 4 and 5 compared to FIGS. 2 and 3 show a simplified embodiment of the internal combustion engine 2 according to the invention, again under partial load conditions (FIG. 4) and full-load conditions (FIG. 5). While the embodiment given in FIGS. 2 and 3 shows separate ventilation lines or sections of the ventilation line for full-load and partial load operation, namely different branches of section 10e of the ventilation line and sections 10a and 10b, respectively, the simplified embodiment only comprises one corresponding but unbranched section of the ventilation line, namely section 10e. In the same way, the return valves 12 and 18 have been dispensed with. Compared to the embodiment given in FIGS. 2 and 3, the simplified embodiment provides somewhat deteriorated separation conditions during partial-load operation. This results from the fact that the pressure difference used for the air-oil separation in the simplified embodiment is relative to the air-intake section before the supercharging element 5, while in the preceding example it is relative to the air-intake section behind the supercharging element 5. In contrast, the air-oil separation conditions under full-load operation remain essentially the same. Nevertheless, a sufficient oil-return as such can be achieved with both embodiments, as the oil return is hardly affected by the simplified ventilation lines.

Figure 6:
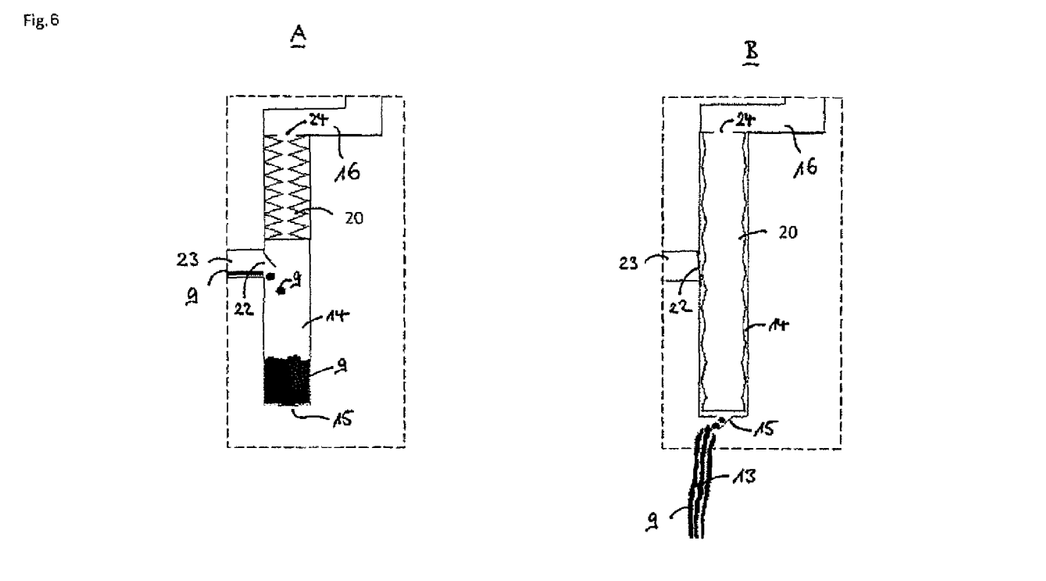
FIGS. 6 to 8: In each case a tank and a actuating element according to the invention under two different conditions, namely partial-load condition and full-load condition.

FIG. 6 in partial figures A and B shows two situations of a tank of a solution according to the invention, comparable to FIGS. 2 and 3, namely in partial-load operation (A) and full-load operation (B). The tank-outlet valve 15 is now arranged in a return line 13 immediately at the outlet of the tank 14. The tank-inlet valve 22 essentially consists in an opening and a valve disk. The actuating element 20 is a bellows, which is connected to the line 16 via a passage 24. During partial-load operation, a vacuum is given in this section, so that the bellows is essentially drawn back and folded. In this case, separated oil can be collected via the line 23 in the tank 14. The tank-outlet valve 15 is closed by the crankcase pressure.

In FIG. 6B, operation under full load is shown. Now, the bellows 20 is charged via the passage 24 with the charge-air pressure given in the line 16. The bellows 20 is extended and this way closes the valve disk of the valve 22. Doing so, the tank 14 in its inner space is essentially charged with the charge-air pressure. This charge-air pressure causes an opening of the tank-outlet valve 15 and therefore a draining of the oil 9 via the return line 13 into the crankcase 3.

Figure 7:
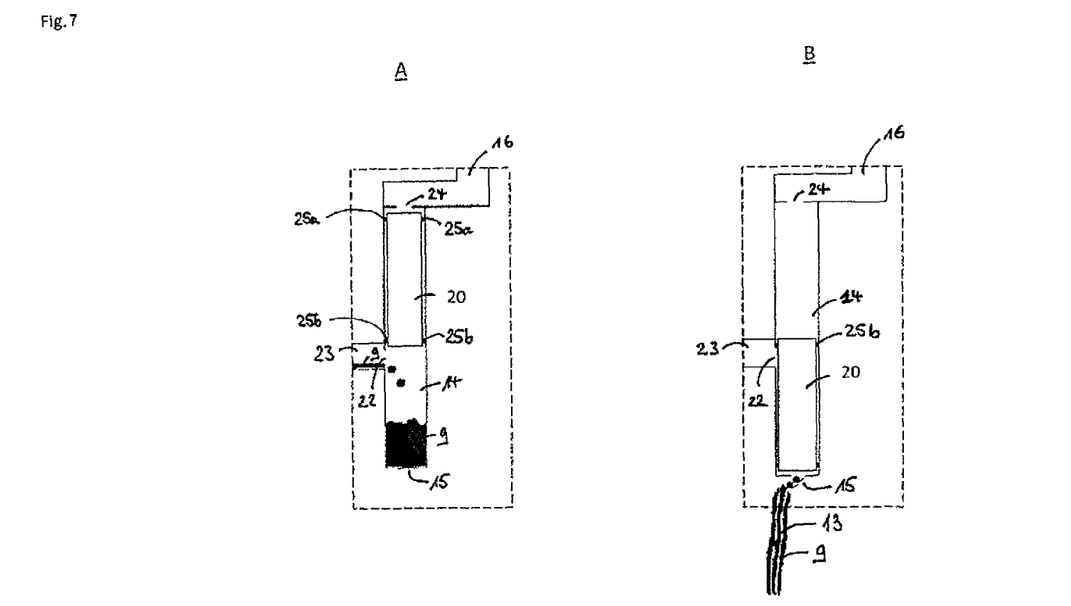

In FIG. 7 in a manner analogous to FIG. 6, two operational situations of a ventilation system 1, namely under partial-load conditions (FIG. 7A) and under full load (FIG. 7B) are illustrated. The actuating element 20 here is no bellows but a piston, which can move upwardly and downwardly within the tank 14. The piston 20 is sealed against the walls of the tank 14 using piston sealing rings 25a and 25b.

Under partial-load conditions, a vacuum is given in the line 16, so that the piston 20 is torn upwardly and oil 9 can collect in the tank 14. When the piston 20 is charged with the charge-air pressure via the line 16 and the passage 24, the piston is pressed downwardly, so that the inner chamber of the tank 14 and the oil collected there are charged with the pressure charging the piston. This pressure is essentially the charge-air pressure or a pressure derived from the charge-air pressure. The opening together with the piston 20 forms the tank-inlet valve 22.

Figure 8:
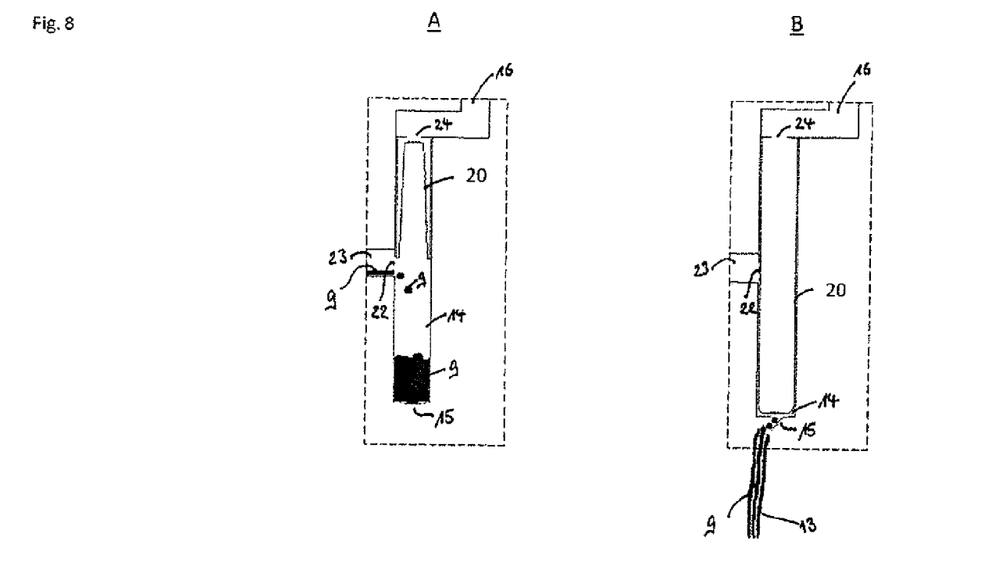

FIG. 8 shows an additional example for an embodiment of a actuating element 20 in an illustration comparable to FIGS. 4 and 5. Here, a flexible membrane is used as the actuating element 20, which can unroll on the wall of the tank 14. Under partial-load conditions, as shown in FIG. 8A, this rolling membrane 20 is torn upwardly in the direction of the passage 24 and this way releases the opening of the tank-inlet valve 22. Under full-load conditions, as shown in FIG. 8B, this flexible membrane 20 is charged with the charge-air pressure or a pressure derived from the latter through the passage 24 and further via the line 16. This way, the rolling membrane unrolls on the wall of the tank 14. Doing so, it on the one hand closes the opening of the tank-inlet valve 22 and works as a valve closure and on the other hand exerts this pressure to the inner space of the tank 14 and to the oil 9 in the tank 14 via the passage 24. As a result, the tank-outlet valve 15 is opened so that the oil 9 can drain and be actively returned into the crankcase.

Figure 9:
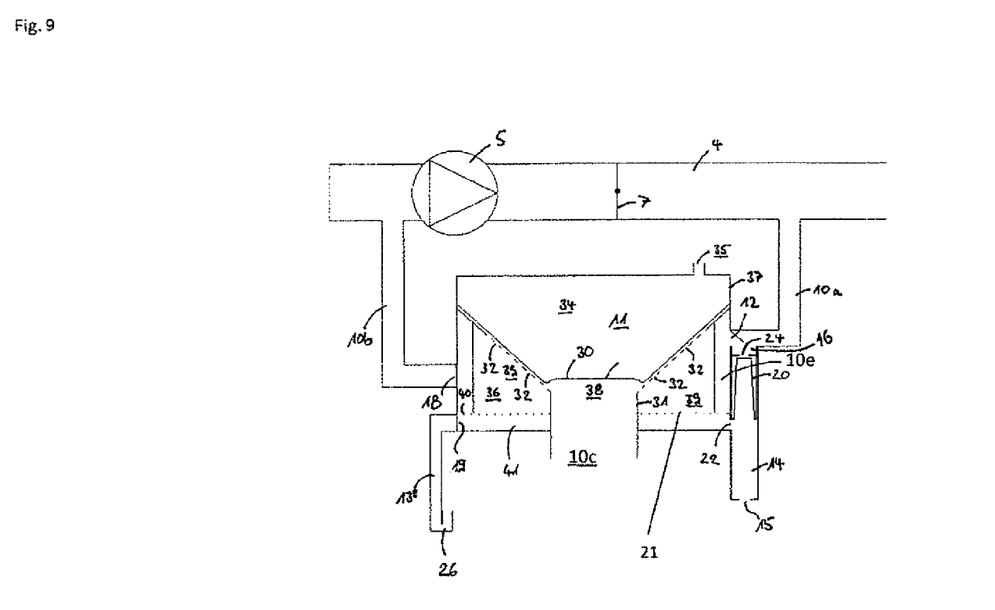
FIG. 9: A section of a ventilation system according to the invention under partial-load condition.
Figure 10:
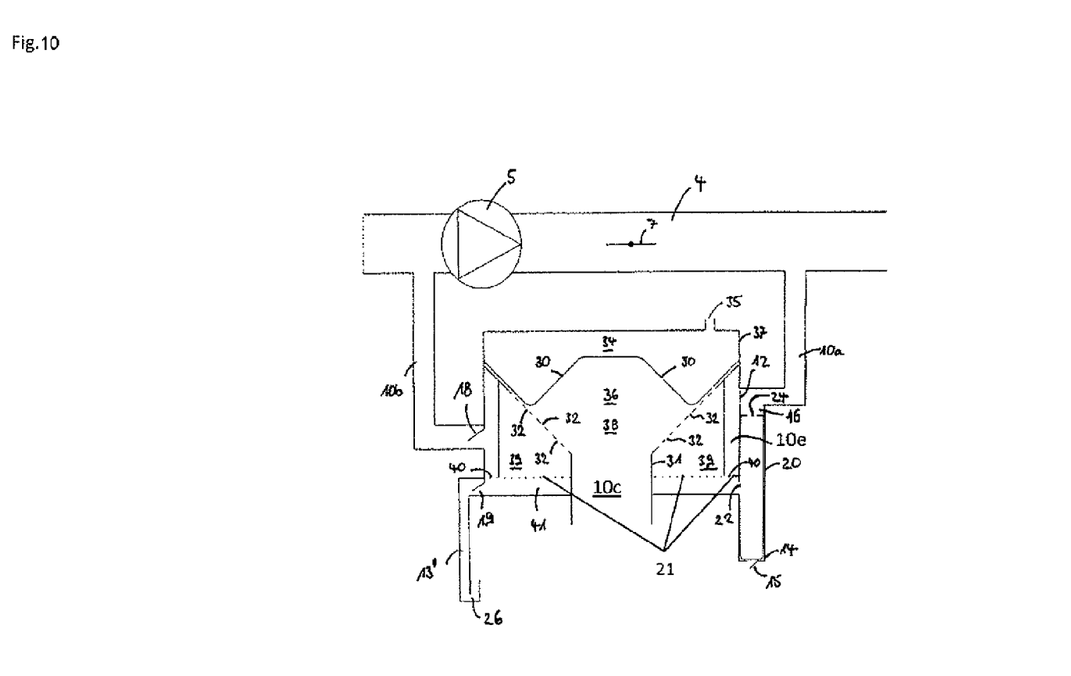
FIG. 10: A section of a ventilation system from FIG. 7 under full-load condition.

FIGS. 9 and 10 show a further variant of a ventilation system according to the invention. This ventilation system as the preceding example as the actuating element comprises an elastic rolling membrane comparable to FIG. 6, which can unroll along the wall of a tank 14. Under partial-load conditions as it is shown in FIG. 9, the rolling membrane 20 is charged with the vacuum between the throttle flap and the air inlet valve 8 in the intake section. The rolling membrane 20 is therefore retracted and releases the opening 22 for the passage of separated oil. As is illustrated in FIG. 10 for the full-load operation, the rolling membrane 20 under full-load operation is charged with the charge-air pressure of the supercharger via the passage 24, so that it unrolls along the entire inner wall of the tank 14 as far as possible and this way closes the oil access opening. The oil access opening and the rolling membrane 20 thus form a tank-inlet valve 22 for the tank 14. At the same time, the rolling membrane 20 transmits the pressure from the supercharger 5 to the inner space of the tank 14 and to the separated oil 9 inside the tank 14, so that this pressure opens the tank-outlet valve 15 of the tank 14 and the separated oil 9 can be released from the tank 14.

In addition to this actuating element, subsequent to the section 10c, a further valve is arranged in the ventilation line 10, which at the same time acts as pressure control valve 11b and air-oil separator 11a. The spatial separation of the elements 11a and 11b in FIGS. 2 and 3 is here now canceled, so that the combined element comprising air-oil separator and pressure control valve is referred to with a single reference number 11. As a consequence, the section 10d of the ventilation line 10 is also omitted. Such pressure-control valves are described in DE 102007012483 A1. These pressure-control valves with respect to their entire construction, in particular of their housings, their conical walls, their flexible, namely rolling, membrane, with respect to their pressure control and their arrangement in the passage openings are designed as described DE 102007012483 A1, so that the disclosure in this document is incorporated in this respect in the present description of the pressure-control valves.

This pressure-control valve comprises a housing 37. Inside of the housing 37, the inner space of the housing 37 is split into two compartments 38 and 39. The first one of the compartments, 38, is connected to the ventilation line 10c on the inlet side. The second one of the compartments, 39, is connected to the outlet 40. The wall 31 comprises a conical area, which comprises openings 32. The conical area of the wall 31 in this context may also comprise only one single opening 32. In FIGS. 7 and 8, an embodiment is shown in which in the extension direction of the cone, several openings 32 follow each other. Further, the openings are also arranged along the radial extension of the cone with identical or different distances.

Inside of this compartment 38 and inside of the cone, a flexible gas-tight membrane 30, namely a rolling membrane is further arranged for the pressure control, which divides the inner chamber of the housing 37 into two compartments 34 and 36. The compartment 34 is charged with a reference pressure, e.g. the atmospheric pressure, through an opening 35. If the crankcase pressure is now smaller than the reference pressure, e.g. the atmospheric pressure, then the pressure-regulating rolling membrane 30 is sucked via the openings 32 to the conical wall and in this direction unrolls in the direction of the inlet of the valve. Such a state for instance occurs under partial-load conditions as it is shown in FIG. 7. With an increasing degree of unrolling, the pressure-control rolling membrane covers an increasing number of openings 32 and this way increases the pressure drop through the wall 31. When blow-by gases pass through the openings 32, oil is in particular separated at the openings 32, which oil collects in a collecting area 41 and subsequently flows away through the opening 22 into the tank 14.

Above this collecting area 41 and in gas flow direction ahead of the ventilation line 10e, an oil-foam barrier 21 is arranged, which is to prevent that oil or oil foam is carried over upwardly. This way, the air-oil separation is further optimized. The separated oil on its way towards the ventilation line 10e passes twice through the oil-foam barrier 21.

Under full-load condition, the suction pressure in the ventilation line 10b for full load charges the wall 31 on the outside. This pressure is smaller than the suction pressure in the ventilation line 10a during partial-load operation as it is shown in FIG. 7. Accordingly, with a constant blow-by volume, the pressure-control rolling membrane 30 is torn upwardly due to the reduced pressure difference between the pressure in the ventilation line 10b for full load and the reference pressure and further unrolls on the conical wall 31 in the direction of the compartment 34. Doing so, the pressure-control rolling membrane 30 releases an increasing number of openings 32, through which the blow-by gases can flow now. Using this pressure-control rolling membrane, the pressure drop through the wall is thus controlled and at the same time, the degree of separation in the openings 32 is influenced. At reduced pressure difference compared to the reference pressure, a large number of openings are released and this way the pressure drop is reduced. As a consequence, a sufficiently high ventilation flow can be guaranteed even with a reduced pressure difference in the ventilation line compared to the reference pressure, which leads however to a reduced separation rate. In the ventilation line 10b for full-load conditions, a second return valve 18 is additionally arranged between the collecting area 41 and the ventilation line 10b, which during partial-load operation, as shown in FIG. 7, is closed. During full-load operation, when the first return valve 12 is closed, the second return valve 18 is open, so that now the ventilation line 10b for full load is available for the ventilation.

In the embodiments in FIGS. 7 and 8, an additional return line 13' is given between the collection area 41 and the crankcase which is not shown here. It is arranged in parallel to the tank 14 between the collection area 41 and a crankcase which is not shown here. In this return line 13', an additional return valve 19 is arranged, which during partial-load operation is closed and under full-load operation is open. In this return line 13' a siphon 26 is arranged behind the return valve 19, which siphon enables a collection, release and return of the separated oil collected in the collection area 41 into the crankcase even with a permanent full-load operation, where the tank-inlet valve 22 remains closed over a considerable period of time.

The invention claimed is:

1. A ventilation system for a crankcase for the transport of blow-by gases from the crankcase to the intake section of an internal combustion engine with supercharger and a throttle flap, comprising:
   a ventilation line reaching from the crankcase to the segment of the intake section between the supercharger and the air inlet valve,
   an air-oil separator arranged in the ventilation line, and
   a return line for the return of oil separated in the air-oil separator via a tank and a tank outlet valve into the crankcase, wherein the tank and the tank outlet valve are located between the air-oil separator and the crankcase,
   wherein an actuating element is arranged in or at the tank, said actuating element is charged with the pressure in the intake line behind the supercharger as working pressure and which upon sufficiently high pressure transports the oil present in the tank via the tank outlet valve into the crankcase.

2. The ventilation system of claim 1, wherein the tank inlet valve is between the air-oil separator and the actuating element.

3. The ventilation system of claim 1, further comprising a first check valve arranged in the ventilation line behind the air-oil separator with respect to a gas-flow direction where the actuating element is charged with the pressure in the ventilation line in a ventilation direction behind the first check valve when both the supercharger is not active and the throttle flap is closed.

4. The ventilation system of claim 1, wherein the actuating element is returned into its original position when the pressure difference between the intake section behind the throttle flap and the crankcase changes from positive to negative.

5. The ventilation system of claim 3, wherein between the ventilation line behind the first check valve or the intake section behind the supercharger on the one hand and the tank on the other hand, a connection line is arranged in order to charge the actuating element with the pressure given in the ventilation line behind the first check valve.

6. The ventilation system of claim 1, wherein the actuating element comprises a flexible or moveable element, selected from the group consisting of a pressure piston, an elastic membrane, a rolling membrane and a bellows.

7. The ventilation system of claim 1, wherein at or in an inlet of the tank for separated oil, a tank inlet valve is arranged, which is closed upon sufficiently high pressure difference between the ventilation line behind the first check valve and the crankcase.

8. The ventilation system of claim 1, wherein the actuating element or an element comprises a valve closure of a tank inlet valve or the tank inlet valve.

9. The ventilation system according of claim 1, further comprising an oil-foam barrier arranged between the air-oil separator and the tank.

10. The ventilation system of claim 9, wherein the gas from which the oil has been separated, on its way from the air-oil separator to the intake section has to pass the oil-foam barrier twice.

11. A ventilation system for a crankcase for the transport of blow-by gases from the crankcase to the intake section of an internal combustion engine with supercharger and a throttle flap, comprising:
   a ventilation line reaching from the crankcase to the segment of the intake section between the supercharger and the air inlet valve,
   an air-oil separator arranged in the ventilation line, and
   a return line for the return of oil separated in the air-oil separator via a tank and a tank outlet valve into the crankcase, wherein the tank and the tank outlet valve are located between the air-oil separator and the crankcase,
   wherein an actuating element is arranged in or at the tank in the return line between the air-oil separator and the crankcase, said actuating element is charged with the pressure in the intake line behind the supercharger as working pressure and which upon sufficiently high pressure transports the oil present in the tank via the tank outlet valve into the crankcase,
   wherein the tank inlet valve is between the air-oil separator and the actuating element.

* * * * *